L. CANFIELD.
REVERSING GEARING.
APPLICATION FILED MAY 9, 1910.
973,915.
Patented Oct. 25, 1910.
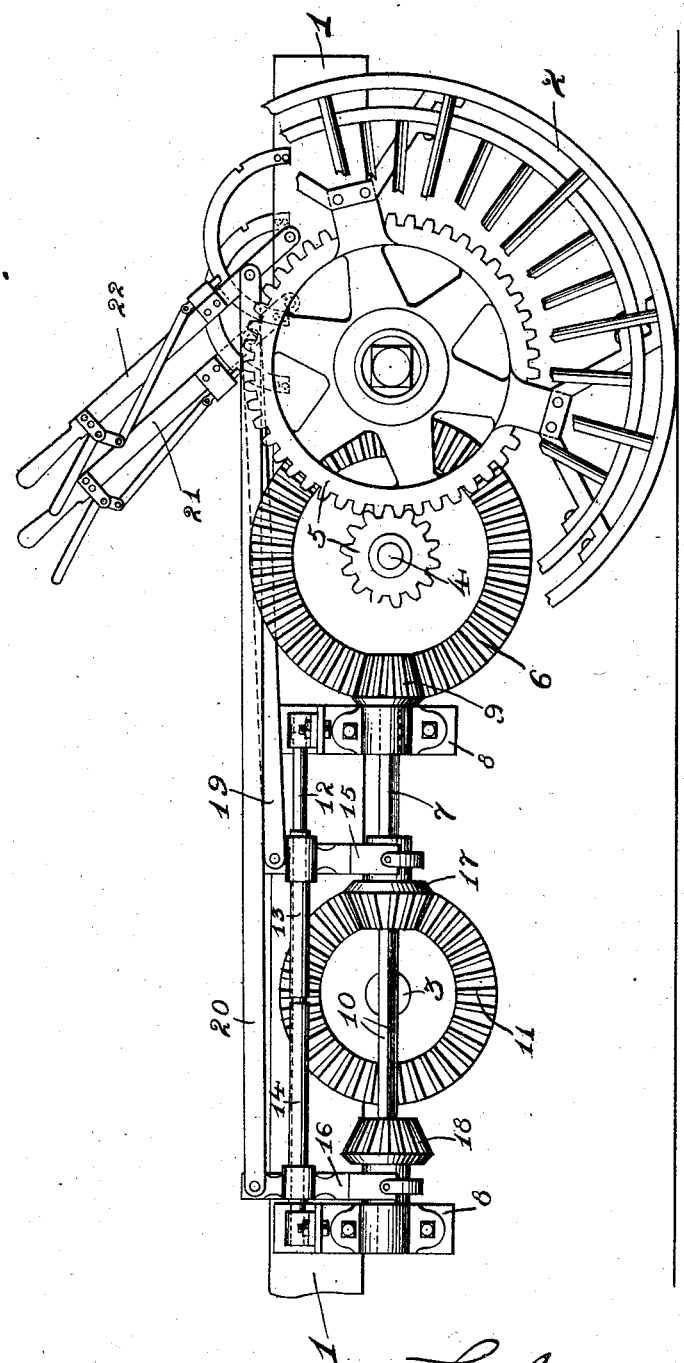
Witnesses
Inventor
Lee Canfield
By
Attorney

UNITED STATES PATENT OFFICE.

LEE CANFIELD, OF SPARTA, WISCONSIN.

REVERSING-GEARING.

973,915. Specification of Letters Patent. Patented Oct. 25, 1910.

Application filed May 9, 1910. Serial No. 560,226.

*To all whom it may concern:*

Be it known that I, LEE CANFIELD, a citizen of the United States, residing at Sparta, in the county of Monroe and State of Wisconsin, have invented certain new and useful Improvements in Reversing-Gearing, of which the following is a specification.

My invention relates to reversing gearing for power driven machinery and is especially adapted to gearing for traction engines and the like, and has for its object the provision in combination with a beveled gear wheel on the power shaft of beveled pinions on the driven shaft separately movable so that either or both pinions may be actuated out of gear with the power gear wheel, and in providing means to prevent both driven pinions being actuated into engagement with the power gear wheel simultaneously.

My invention will be described in detail hereinafter and illustrated in the accompanying drawing which is a fragmentary view of a traction engine frame showing my improved reversing gearing applied thereto.

In the drawing 1 indicates the frame of a motor driven vehicle on which are journaled the traction wheels 2, the power shaft 3, and the driven shaft 4 geared to the traction wheel shaft by means of spur gearing 5.

6 indicates a beveled gear wheel keyed to shaft 4 and 7 a counter shaft journaled in bearings 8 and having a pinion 9 keyed thereto that meshes with beveled gear wheel 6, the shaft between the bearings 8 as indicated at 10 being formed rectangular in cross section.

11 indicates a beveled gear wheel secured to power shaft 3.

12 indicates a rod secured to frame 1, 13 and 14 sleeves slidably mounted on rod 12; 15 and 16 arms secured to said sleeves; and 17 and 18 beveled pinions mounted on the rectangular portion 10 of shaft 7 and revolubly mounted in arms 15 and 16.

19 and 20 indicate rods connecting arms 15 and 16 with levers 21 and 22 respectively.

In operation the vehicle is driven in one direction by moving the lever 21 so as to slide pinion 17 into engagement with gear wheel 11, and reversed by moving pinion 17 out of mesh with gear wheel 11 and moving pinion 18 into mesh with gear wheel 11 by manipulating lever 22 connected therewith.

As shown in the drawings sleeves 13 and 14 are longer than the radius of gear wheel 11 so that when one pinion 17 or 18 is in mesh with the wheel, the other pinion cannot be moved into engagement with the gear wheel, being prevented from doing so by engagement of sleeves 13 and 14, both pinions may, however, be held withdrawn from mesh with the gear wheel 11 when it is desired to stop the vehicle.

Having thus described my invention, what I claim is:

1. A reversing gearing for power driven machinery comprising a power shaft, a driven shaft, and a counter shaft geared to the driven shaft, a beveled gear wheel secured to the power shaft, beveled pinions slidably mounted on the counter shaft and adapted to engage the beveled gear wheel, means to separately actuate the pinions, and means extending from the pinion mountings and adapted to engage one another to prevent the two pinions from simultaneously engaging the gear wheel.

2. In a reversing gearing for power driven machinery, a power shaft, a counter shaft geared to the driven shaft, a gear wheel secured to the power shaft, pinions slidably mounted on the counter shaft and adapted to mesh with the power gear wheel, a rod suitably secured, sleeves slidably mounted on said rod, and arms secured to said sleeves and engaging the pinions, said sleeves being longer than the radius of the power gear wheel to prevent the two pinions from simultaneously meshing with said gear wheel.

3. A reversing gearing for power driven machinery comprising a power shaft, a driven shaft, a counter shaft rectangular in cross section and geared to the driven shaft, a beveled gear wheel secured to the power shaft, a rod suitably secured, sleeves slidably mounted on said rod, arms secured to the sleeves beveled pinions journaled in said arms and slidably mounted on the rectangular portion of the counter shaft, and levers suitably mounted and connected to said arms, the sleeves aforesaid being longer than the radius of the power gear wheel to prevent simultaneous engagement of the pinions therewith.

In testimony whereof I hereto affix my signature in the presence of two witnesses.

LEE CANFIELD.

Witnesses:
R. B. GRAVES,
W. F. ALLEN.